United States Patent
Omeragic et al.

(10) Patent No.: US 6,819,110 B2
(45) Date of Patent: Nov. 16, 2004

(54) ELECTROMAGNETIC RESISTIVITY LOGGING INSTRUMENT WITH TRANSVERSE MAGNETIC DIPOLE COMPONENT ANTENNAS PROVIDING AXIALLY EXTENDED RESPONSE

(75) Inventors: Dzevat Omeragic, Sugar Land, TX (US); Cengiz Esmersoy, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 123 days.

(21) Appl. No.: 10/108,056

(22) Filed: Mar. 26, 2002

(65) Prior Publication Data

US 2003/0184302 A1 Oct. 2, 2003

(51) Int. Cl.⁷ .................................................. G01V 3/08
(52) U.S. Cl. ...................................... 324/338; 324/339
(58) Field of Search ................................ 324/338, 339, 324/340, 341

(56) References Cited

U.S. PATENT DOCUMENTS

| | | | |
|---|---|---|---|
| 4,319,191 A | | 3/1982 | Meador et al. |
| 4,857,852 A | | 8/1989 | Kleinberg et al. |
| 5,442,294 A | * | 8/1995 | Rorden ........................ 324/339 |
| 5,721,491 A | * | 2/1998 | Van Der Horst ............ 324/339 |
| 5,966,013 A | * | 10/1999 | Hagiwara .................... 324/339 |
| 6,044,325 A | | 3/2000 | Chakravarthy et al. |
| 6,100,696 A | * | 8/2000 | Sinclair ....................... 324/339 |
| 6,147,496 A | | 11/2000 | Strack et al. |
| 6,188,222 B1 | * | 2/2001 | Seydoux et al. ............. 324/339 |
| 6,297,639 B1 | * | 10/2001 | Clark et al. ................. 324/338 |
| 6,502,036 B2 | * | 12/2002 | Zhang et al. ................. 702/7 |
| 2003/0016020 A1 | * | 1/2003 | Gianzero ..................... 324/342 |

FOREIGN PATENT DOCUMENTS

| | | |
|---|---|---|
| EP | 0909398 B1 | 9/2002 |
| GB | 2374937 | 10/2002 |
| WO | WO 93/07514 | * 4/1993 |
| WO | WO 96/18120 | 6/1996 |

* cited by examiner

Primary Examiner—Jay Patidar
(74) Attorney, Agent, or Firm—Kevin P. McEnaney; Brigitte L. Echols; John Ryberg

(57) ABSTRACT

An electromagnetic well logging instrument is disclosed which includes at least one transmitter antenna oriented to have at least some magnetic dipole moment component transverse to an axis of the instrument. The instrument includes at least two receiver antennas oriented to have at least some magnetic dipole moment component transverse to the axis and parallel to the magnetic dipole moment component of the at least one transmitter antenna. The at least two receiver antennas are axially spaced apart from the transmitter antenna so that a response of the instrument to the transverse magnetic dipole moment component is axially substantially on one side of a more distant spaced one of the at least two receiver antennas.

34 Claims, 5 Drawing Sheets

ELECTROMAGNETIC RESISTIVITY LOGGING INSTRUMENT WITH TRANSVERSE MAGNETIC DIPOLE COMPONENT ANTENNAS PROVIDING AXIALLY EXTENDED RESPONSE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF INVENTION

1. Field of the Invention

The invention relates generally to the field of electromagnetic well logging instruments. More specifically, the invention relates to methods and apparatus for electromagnetic resistivity logging which can measure properties of formations not yet penetrated by a wellbore, or axially "ahead of the bit."

2. Background Art

There are two general classes of electromagnetic (EM) resistivity well logging instruments known in the art. One such class is known as electromagnetic propagation resistivity logging, the other is known as electromagnetic induction resistivity logging.

EM propagation resistivity logging of earth formations is typically performed by an instrument that forms part of a drill string. Such instruments are commonly referred to as "logging while drilling" (LWD) instruments. Typical EM propagation LWD instruments include one or more transmitter antennas, and a plurality of receiver antennas disposed on a drill collar. Radio frequency (RF) power, usually at a frequency in a range of 0.1 to 10 MHz is passed through the one or more transmitter antennas, and an amplitude and phase of RF voltages induced in the receiver antennas are measured. Generally, the conductivity of earth formations proximate any pair of receiver antennas is related to the amplitude ratio and phase difference of the induced voltages between the receiver antennas.

In most EM propagation resistivity LWD instruments, the antennas are formed as loops or coils wound around the exterior of the instrument or drill collar so that they form magnetic dipoles having moments substantially parallel to the axis of the instrument. Such a configuration makes the instrument mainly responsive to the formations disposed laterally around the wellbore proximate the antennas. Various combinations of transmitter and receiver antennas are known in the art which provide responses in particular selected axial positions along the drill collar, and at selected lateral depths from the wellbore, but the sensitivity of most EM propagation LWD instruments is primarily laterally around the instrument. Such sensitivity is most useful when the instrument axis is substantially perpendicular to the attitude ("dip") of the various layers of the earth formations penetrated by the wellbore. This is typically the case where the dip is close to zero or equal to zero and the wellbore is drilled substantially vertically. Many wellbores, however, are drilled at substantial inclination, up to and including horizontal, and many earth formations have substantial dip inclination from horizontal. In such cases, or any combination thereof which results in high "apparent dip" (angle between wellbore inclination and formation dip), lateral sensitivity is less useful. An LWD resistivity instrument which has substantial axial sensitivity would be desirable in these cases, in one particular application to detect the presence of resistivity discontinuities which have not yet been penetrated by the wellbore (axially "ahead of the bit").

An important advantage offered by LWD instruments is that measurements of properties of earth formations penetrated by a wellbore can be transmitted to the earth's surface substantially in "real time", meaning while such formations are actually being penetrated by the drilling thereof, or very shortly thereafter. Such capability can provide the wellbore operator with information that may improve drilling efficiency, improve the accuracy of characterization of fluid content of the formations, and reduce risk of unexpectedly encountering drilling hazards. It is particularly desirable, therefore, to have an electromagnetic propagation LWD instrument which has axial sensitivity in formations "ahead of the bit", meaning formations which have not yet been penetrated by the wellbore while the well is being drilled.

EM induction logging instruments include a source of alternating current which is coupled to a transmitter antenna. The alternating current has a frequency typically in a range of 10 to 200 KHz. The alternating current passing through the transmitter antenna induces time varying EM fields in the earth formations surrounding the instrument. One or more receiver antennas are disposed on the instrument at selected positions. The receivers are coupled to circuits in the instrument which are adapted to determine components of the voltages induced in the receiver antennas which have magnitudes related to the magnitude of eddy currents induced in the formations by the time varying EM fields (the latter being ultimately induced by the transmitter current). As is well known in the art, the magnitude of the eddy currents, and the corresponding receiver voltage components, are related to the electrical conductivity of the earth formations. Typically, the transmitter and receiver antennas are arranged on induction logging instruments so that the response of the instrument is primarily related to conductivity of the formations disposed laterally about the instrument, in a manner similar to propagation logging. More specifically, the region about the instrument to which the measurements mainly correspond is generally disposed axially between the transmitter and receiver antennas. Various arrangements of transmitter and receiver antennas are known in the art to further delimit the sensitive region to various axial and lateral (radial) zones about the instrument, but generally speaking, the response of the instrument is mostly confined between the axially endmost transmitter and receiver antennas on the instrument. As is the case for LWD instruments, it is desirable to have an induction logging instrument which can measure in a zone as yet to be penetrated by a wellbore.

SUMMARY OF INVENTION

One aspect of the invention is an electromagnetic well logging instrument which includes at least one transmitter antenna oriented to have at least some magnetic dipole moment component transverse to an axis of the instrument. The instrument includes at least two receiver antennas oriented to have at least some magnetic dipole moment component transverse to the axis and parallel to the magnetic dipole moment component of the at least one transmitter antenna. The at least two receiver antennas are spaced apart from the transmitter antenna so that a response of the instrument to the transverse magnetic dipole moment component is axially substantially on one side of a more distant spaced one of the at least two receiver antennas. In one embodiment, the instrument includes circuits coupled to the antennas adapted to make electromagnetic induction measurements of earth formations. In another embodiment, the instrument includes circuits coupled to the antennas adapted to make electromagnetic propagation measurements of the earth formations. In a particular embodiment, a ratio of spacing from the transmitter of the closer one of the receiver antennas to the spacing from the transmitter of the more distant one of the receiver antennas is about 0.563.

Another aspect of the invention is an electromagnetic well logging instrument which includes at least one receiver antenna oriented to have at least some magnetic dipole moment component transverse to an axis of the instrument. The instrument further includes at least two transmitter antennas oriented to have at least some magnetic dipole moment component transverse to the axis and parallel to the magnetic dipole moment component of the at least one receiver antenna. The at least two transmitter antennas are axially spaced apart from the receiver antenna so that a response of the instrument to the transverse magnetic dipole moment component is axially substantially on one side of a more distant spaced one of the at least two transmitter antennas. In another embodiment, the instrument includes circuits coupled to the antennas adapted to make electromagnetic propagation measurements of the earth formations. In a particular embodiment, a ratio of spacing from the receiver antenna of the closer one of the transmitter antennas to the spacing from the receiver antenna of the more distant one of the transmitter antennas is about 0.563.

A method for electromagnetic resistivity well logging according to another aspect of the invention includes passing alternating current through a transmitter antenna disposed in a wellbore. The transmitter has at least some dipole moment component in a direction perpendicular to an axis of the wellbore. The method then includes detecting voltages induced in at least two receiver antennas each having at least some dipole moment component parallel to the dipole moment component of the transmitter antenna. The at least two receiver antennas are axially spaced apart from the transmitter antenna such that a response of the receivers is substantially axially to one side of the more distant one of the receiver antennas.

A method for electromagnetic resistivity well logging according to another aspect of the invention includes passing alternating current through at least two transmitter antennas disposed in a wellbore. The transmitter antennas have at least some dipole moment component in a direction perpendicular to an axis of the wellbore. The method then includes detecting voltages induced in a receiver antenna having at least some dipole moment component parallel to the dipole moment component of the transmitter antennas. The at least two transmitter antennas are axially spaced apart from the receiver antenna such that a response of the receiver antenna is substantially axially to one side of the more distant one of the transmitter antennas.

Other aspects and advantages of the invention will be apparent from the following description and the appended claims.

DETAILED DESCRIPTION

Figure 1:
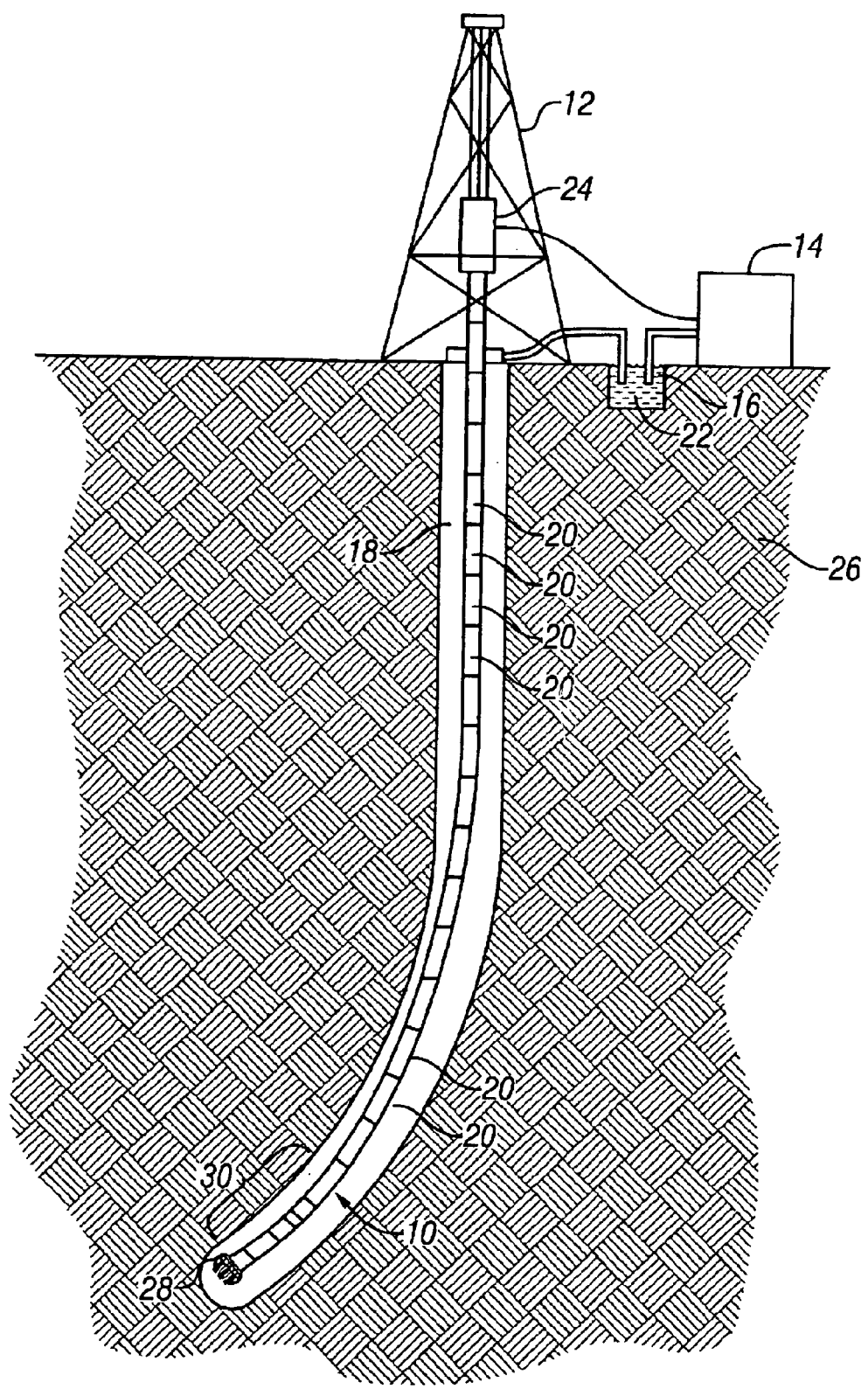
FIG. 1 shows one embodiment of a logging instrument according to the invention being used to measure resistivity while drilling a wellbore.

FIG. 1 shows one embodiment of an EM resistivity logging instrument 10 according to the invention as it is being used to measure resistivity of formations 26 to be penetrated by a wellbore 18. In this embodiment, the resistivity logging instrument 10 is an LWD instrument which forms part of a drilling assembly. The drilling assembly includes threadedly coupled segments 20 ("joints") of drill pipe which are raised and lowered by a drilling rig 12 at the earth's surface. The drilling assembly also includes a bottom hole assembly (BHA) 30 that includes the instrument 10, a drill bit 28, and may include various other devices (not shown separately) such as drill collars, mud motor, stabilizers, and directional drilling tools. The drilling assembly is rotated by a rotary table, or more preferably by a top drive 24 or similar device on the rig 12. Drilling fluid ("mud") 16 is lifted from a tank or pit 22 by mud pumps 14 and is pumped through the drilling tool assembly and out of nozzles or jets in the drill bit 28 to cool the bit and to lift drill cuttings through the wellbore where they are separated from the returning mud 16 at the earth's surface. In some embodiments, the instrument 10 includes some type of telemetry system to communicate at least some of the measurements made thereby substantially in real time to the earth's surface for interpretation and/or recording. Many types of such telemetry systems are known in the art. See, for example, U.S. Pat. No. 4,968,940 issued to Clark et al. Measurements may also be recorded in a storage device (not shown in FIG. 1) in the instrument 10, of any type known in the art, such as one also disclosed in the Clark et al. '940 patent.

Figure 2:
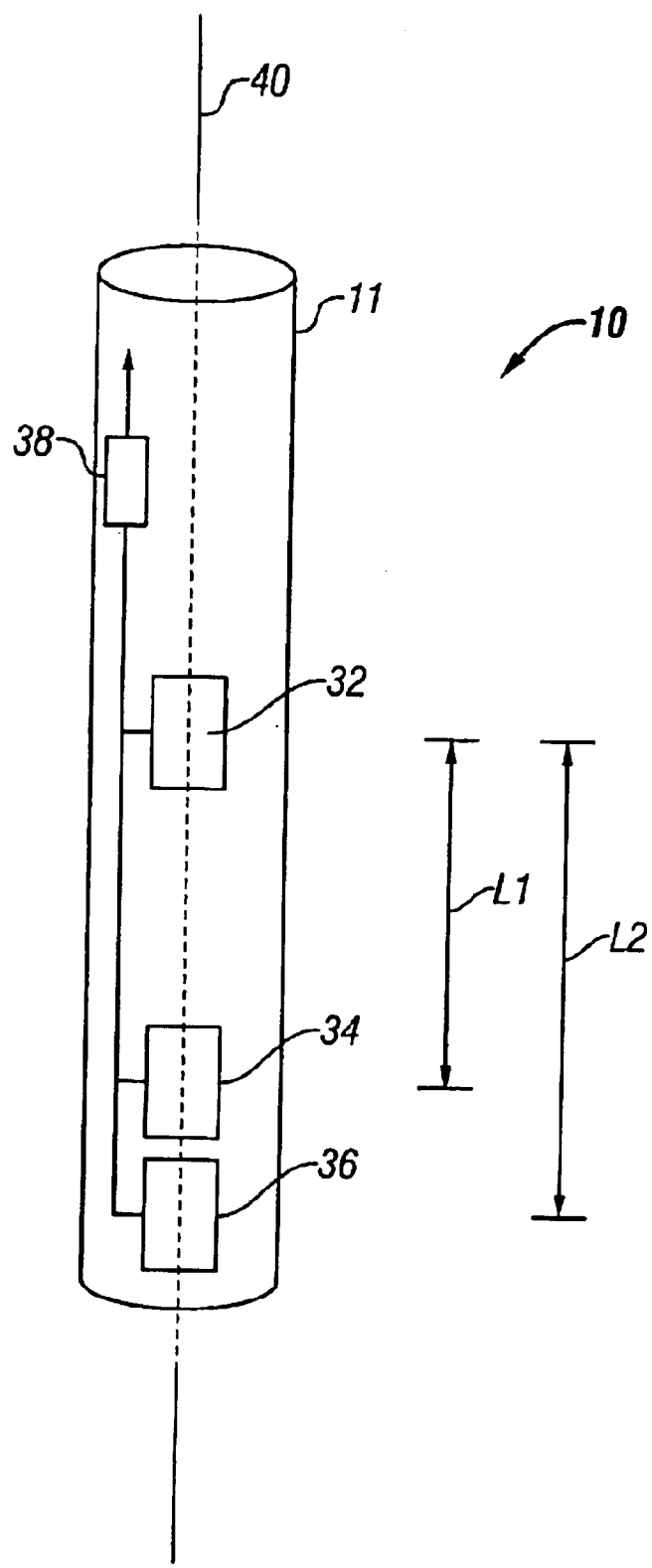
FIG. 2 shows a side view of one embodiment of an instrument according to the invention.

A side view of one embodiment of the well logging instrument 10 according to the invention is shown generally in FIG. 2. The instrument 10 includes a transmitter antenna 32 and receiver antennas 34, 36 disposed on the exterior of a drill collar 11. The collar 11 is preferably made from a non-magnetic alloy such as monel. The transmitter antenna 32 and receiver antennas 34, 36 are coupled to appropriate circuits 38, which may be disposed in the collar 11. The circuits in this embodiment are adapted to send radio frequency power through the transmitter antenna 32, and to measure voltages induced in the receiver antennas 34, 36. In an instrument according to the invention, the transmitter antenna 32 and the receiver antennas 34, 36 form magnetic dipoles having a dipole moment substantially perpendicular to the axis 40 of the collar 11. The magnetic dipole moments of all the antennas 32, 34, 36 are preferably parallel to each other. Receiver antenna 34 is axially spaced from the transmitter antenna 32 by a first spacing indicated by L1, and receiver antenna 36 is axially spaced from the transmitter antenna 32 by a second spacing indicated by L2.

The circuits 38 in one embodiment are adapted to make electromagnetic propagation measurements of properties of the earth formations. Such circuits are well known in the art and are described, for example, in U.S. Pat. No. 4,968,940 issued to Clark et al. referred to previously.

In another embodiment, the circuits 38 are adapted to make electromagnetic induction measurements. Such circuits are well known in the art and are described, for example in U.S. Pat. No. 4,857,852 issued to Kleinberg et al.

While the embodiment shown in FIG. 2 has antennas 32, 34, 36 disposed so that they have magnetic moments substantially perpendicular to the axis 40 of the collar 11, it should be understood that other orientations of the magnetic dipole moment may be used in other embodiments of a well logging instrument according to the invention. For example, "tilted" antennas disposed at an oblique angle, such as 45 degrees from the axis 40, may be used in other embodiments of a well logging instrument. Embodiments of a well logging instrument of the invention include antennas with at least some magnetic dipole moment component that is transverse (perpendicular) to the axis 40 of the instrument 10 (or collar 11). As a practical matter, however, orienting the antennas 32, 34, 36 as shown in FIG. 2 so that their dipole moment is perpendicular to the axis 40 provides maximum sensitivity.

One embodiment of the instrument as shown in FIG. 2 includes the one transmitter antenna 32 and the two receiver antennas 34, 36. Those skilled in the art will appreciate that other embodiments having antennas arranged as shown in FIG. 2 may include one receiver antenna disposed as shown at 32, and two transmitter antennas disposed as shown at 34 and 36. The response of such an embodiment of the well logging instrument including the single receiver antenna and two transmitter antennas is equivalent in response to the previously described embodiment having one transmitter antenna and two receiver antennas.

Figure 3:
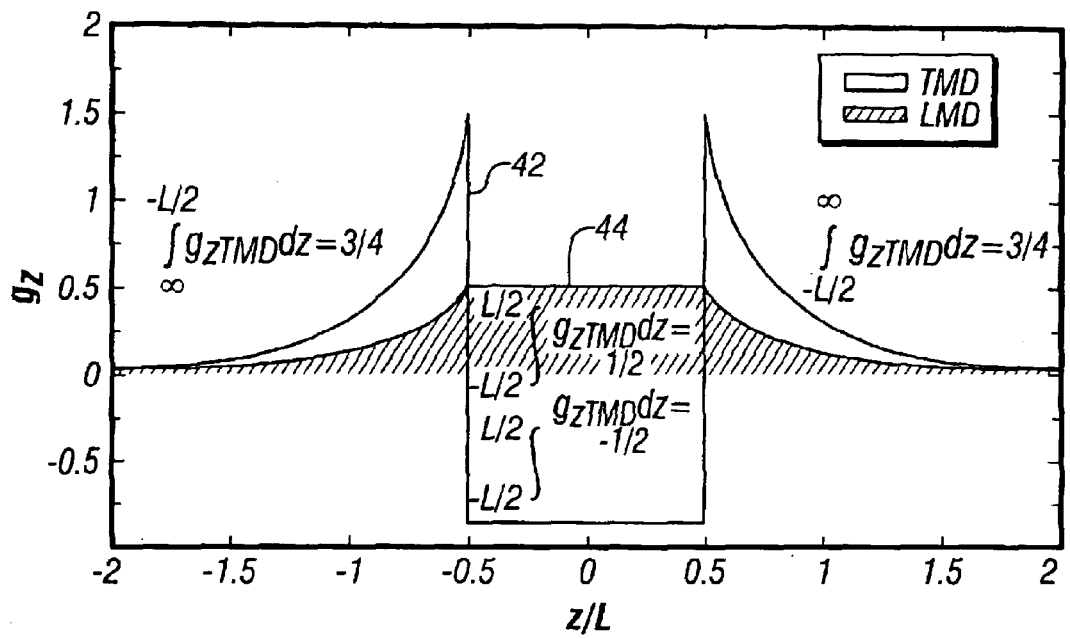
FIG. 3 shows a graph of integrated axial response of an induction or propagation instrument having a single transmitter and single receiver, oriented as longitudinal and transverse magnetic dipoles.

FIG. 3 shows a graph of the response of various electromagnetic induction and propagation transmitter and receiver antenna combinations in order to explain operation of an instrument according to the invention. The coordinate axis of the graph in FIG. 3 is axial position with respect to the logging instrument. Zero on the coordinate axis represents the midpoint between the transmitter antenna (32 in FIG. 2) and any one receiver antenna (such as 34 or 36 in FIG. 2), where the spacing between these two antennas is represented by L, and the axial position is represented by Z. The ordinate axis represents the fraction of the total response (integrated geometric factor) of the instrument which originates in space from an axial position starting at negative infinity (off the left hand edge of the graph) up to each position on the coordinate axis. Curve 44 shows the integrated total response of the instrument where the antennas are disposed so that their dipole moments are substantially parallel to the axis of the instrument (known as longitudinal or axial magnetic dipoles). As can be inferred from curve 44 in FIG. 3, about ½ the total response is from a region between the antennas, the other ½ of the response coming from space axially above and below the positions of the transmitter and receiver antennas. Curve 42 shows the integrated response of a two antenna system where the antennas are disposed so that their dipole moment is substantially perpendicular to the instrument axis (known as transverse magnetic dipoles). For this arrangement, about ¾ of the total response of the instrument is from a region above the axial position of the transmitter or receiver. Another ¾ of the total response originates in the region axially below the transmitter or receiver. The region between the antennas actually has negative response, meaning that the conductivity of media in that region will actually reduce the total receiver signal by an amount corresponding to the conductivity therein.

Figure 4:
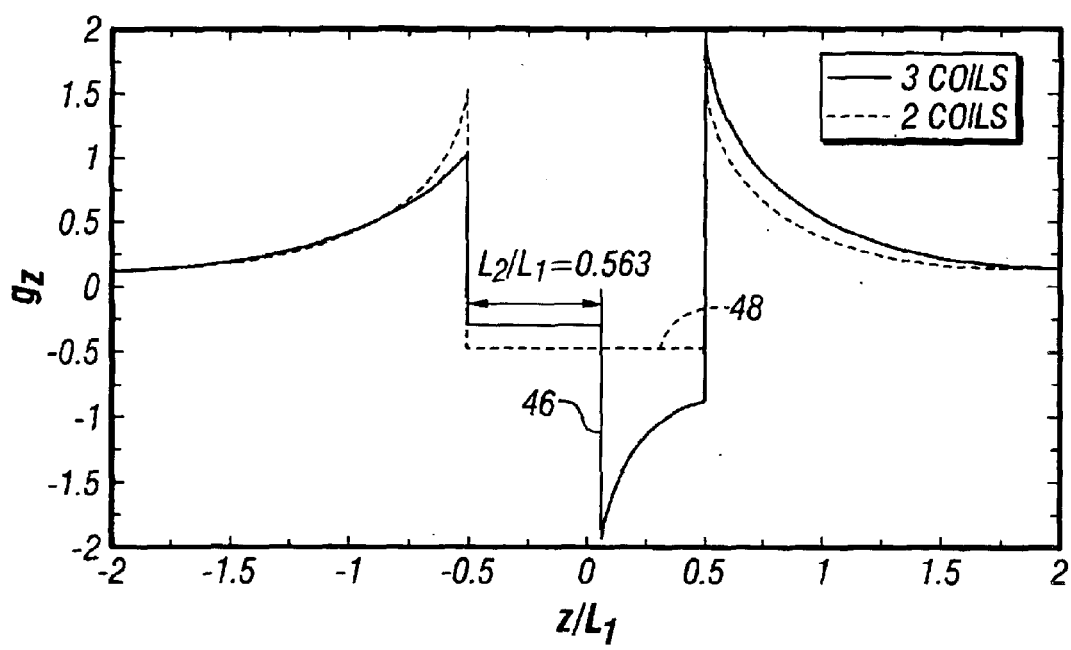
FIG. 4 shows a graph of integrated axial response of a two-antenna and three-antenna transverse magnetic dipole system for a particular antenna spacing.
Figure 5:
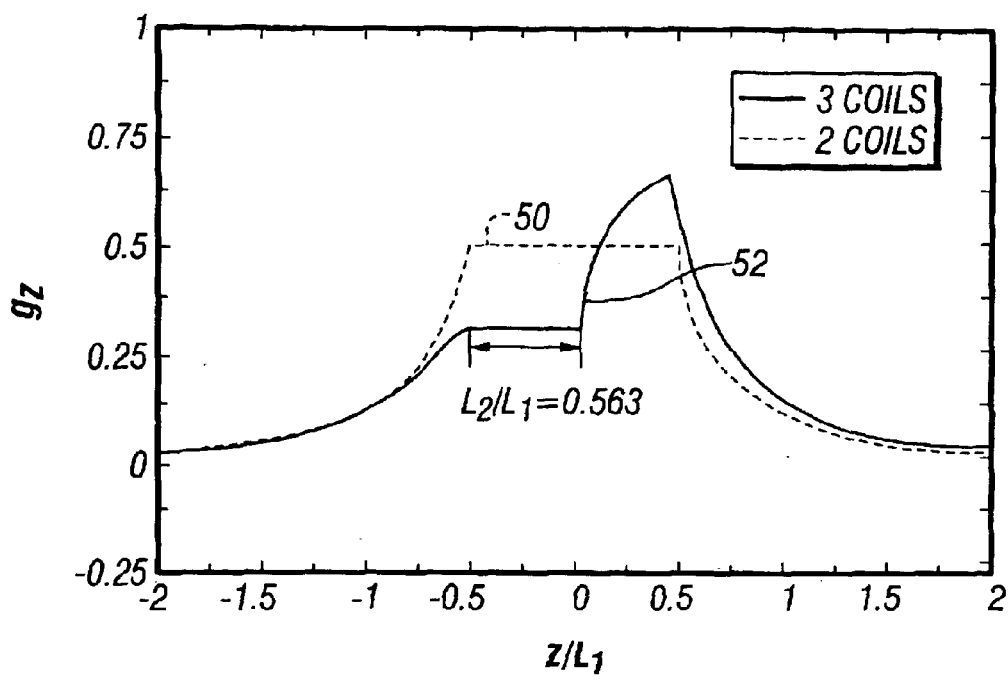
FIG. 5 shows a graph of integrated axial response of a two antenna and three antenna longitudinal magnetic dipole system for a particular antenna spacing.

It has been determined that for an instrument arrangement including at least two receivers, such as shown in FIG. 2, appropriate selection of the spacings (L1 and L2 in FIG. 2) for transverse magnetic dipoles will result in the instrument being sensitive to conductivity in a zone disposed substantially on one side of the instrument axially. FIG. 4 is a graph which shows the integrated response of a two-receiver transverse magnetic dipole system (equivalent to the arrangement of FIG. 2) where the spacings L1 and L2 are selected so that a ratio of the spacings L2/L1 is 0.563. Curve 46 shows the response. As can be inferred from curve 46, substantially all the response of the instrument is from the space axially beyond the more distant receiver antenna (36 in FIG. 2). Response from all other regions of space axially with respect to the transmitter and receivers substantially cancel. As a comparison, the response of a two antennas system is shown at curve 48. FIG. 5 shows integrated axial response of a two antenna system at curve 50 and an arrangement such as in FIG. 2 at curve 52 for a longitudinal magnetic dipole system.

A spacing ratio of 0.563 provides that substantially all of the instrument response is axially from one side of the instrument. It should be understood, however, that other antenna spacings may be used in other embodiments of an instrument according to the invention. It would only be necessary in such embodiments to select a spacing that provides substantial total response to one axial side of the instrument. Methods are well known in the art to determine the axial response for any arrangement of the antennas. Further, it has been determined that the overall instrument response to a conductivity discontinuity axially beyond the instrument on the sensitive side is substantially monotonic when the spacing L2 is selected to be at most about three times the skin depth for a corresponding signal attenuation measurement and at most about equal to the skin depth for corresponding phase shift measurement.

Figure 6:
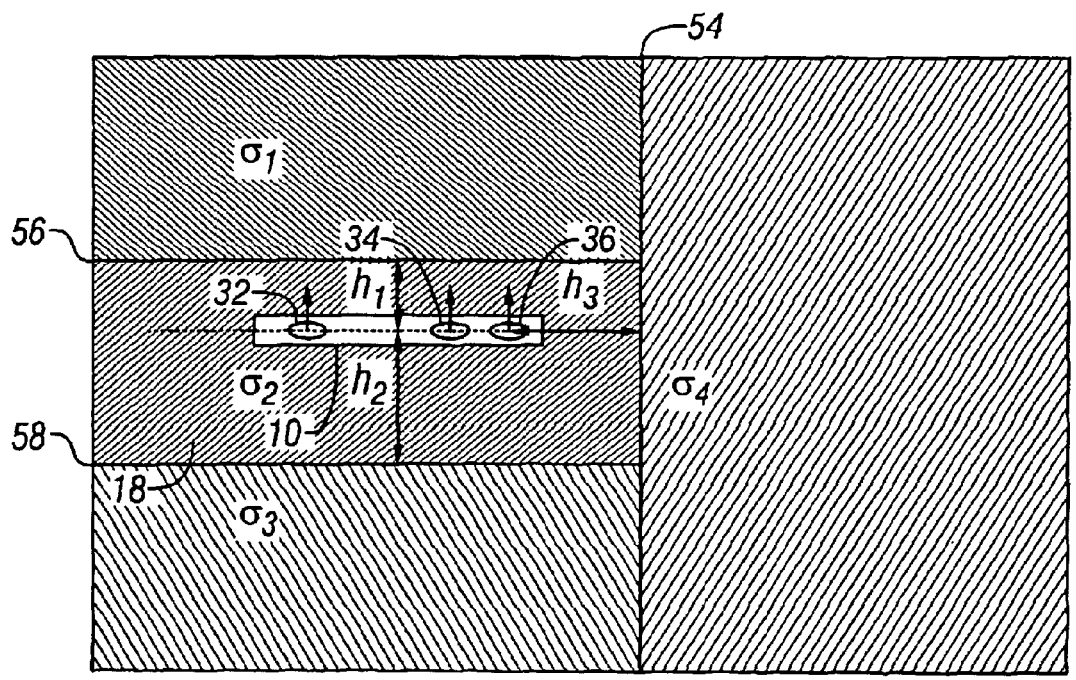
FIG. 6 shows an example of a logging instrument approaching a conductivity discontinuity beyond the axial end of a wellbore.

An example of using an instrument such as shown in FIG. 2 to indicate that the wellbore is approaching a conductivity (resistivity) discontinuity is shown in FIG. 6. The wellbore 18 in FIG. 6 is assumed, for simplicity of description to have the same conductivity as the surrounding formation, this conductivity indicated by $\sigma_2$. The wellbore 18 in this example is shown as being horizontal, and a discontinuity in the conductivity, indicated at 54 between the formation $\sigma_2$ and the formation axially beyond the end of the wellbore, having conductivity $\sigma_4$ is vertical. It should be understood that this relative geometry between the wellbore 18 and discontinuity 54 is only meant to show the principle of operation of an instrument according to the invention. The instrument 10 is sensitive to media axially past the end of the more distant receiver antenna 36. The instrument 10 therefore can detect approach of a discontinuity which is perpendicular to the wellbore, or has a relatively high incidence angle, at any relative inclination of wellbore and discontinuity, as will be appreciated by those skilled in the art. The response of the instrument 10 may be affected by the conductivity of the media laterally displaced from the instrument 10. Examples of such media are shown as $\sigma_1$ at a distance $h_1$ above the instrument 10 across boundary 56, and at $\sigma_3$ at a distance $h_2$ below the instrument 10 across boundary 58. Effect of these media $\sigma_1$, $\sigma_3$ on the measurements affected by the approach of formation $\sigma_4$ can be estimated by making measurements of conductivity using measurements made by axial magnetic dipole antennas, or from the axial magnetic dipole measurement components of antennas oriented at oblique angles, as suggested previously herein.

Figure 7:
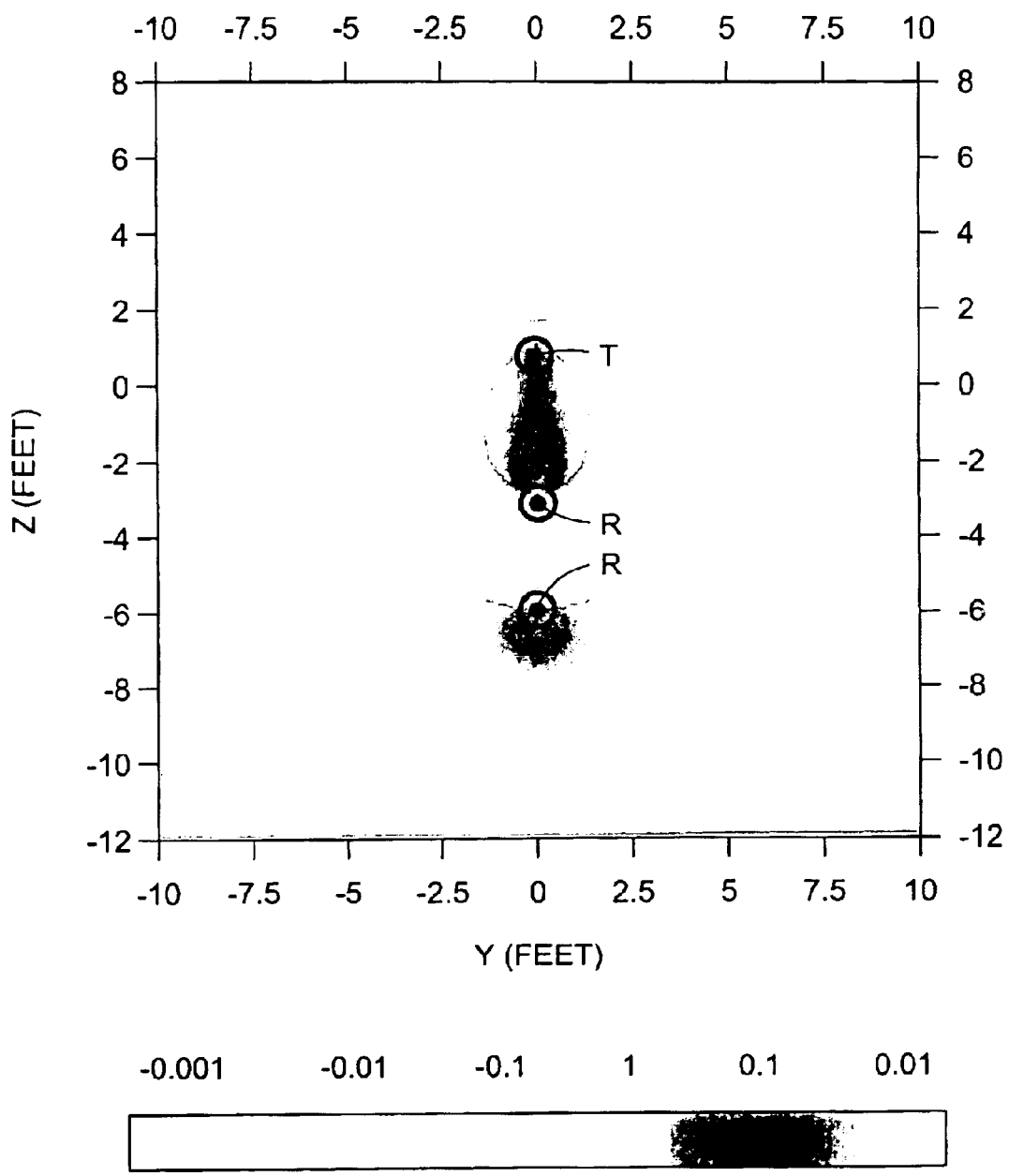
FIG. 7 shows a contour plot of the sensitivity of an instrument eqipped with a transverse component antenna array according to an embodiment of the invention.

In one embodiment of a method according to the invention, the distances between the instrument 10 and the layer above, shown in FIG. 6 as $h_1$, the distance between the instrument and the layer below, shown as $h_2$, and the distance between the bottom of the instrument 10 and the discontinuity 54, shown as $h_3$, may be determined using inversion processing techniques known in the art. Inversion processing, as it relates to this embodiment, includes making an initial estimate of the spatial distributions of the various formations and the discontinuity 54 with respect to the instrument 10. Using the initial estimate, an expected response of the instrument can be determined using forward modeling methods well known in the art. The expected response of the instrument 10 is then compared to the actual response of the instrument 10. The initial estimate of spatial distribution is then adjusted, such as by changing one or more of the distances $h_1$, $h_2$, $h_3$, or one or more of the conductivity values of the media $\sigma_1$, $\sigma_2$, $\sigma_3$, $\sigma_4$. The expected instrument response is recalculated, and again compared with the actual instrument response. This process is repeated until a difference between the expected response and the actual response is minimized. The value of $h_3$ determined at the end of this process is the most likely distance between the instrument 10 and the discontinuity 54. Techniques for inversion processing which can be used with embodiments of the invention are described, for example, in J. E. Dennis, Jr. et al., *Numerical Methods for Unconstrained Optimization and Non Linear Equations*, Prentice Hall, Inc. New Jersey, 1983. Other methods are described, for example, in W. H. Press et al., *Numerical Recipes in FORTRAN*, Cambridge University Press, United Kingdom, 1992. FIG. 7 shows a contour plot of the EM sensitivity of an instrument (instrument axis not shown for clarity of illustration) configured with transverse component antennas according to the invention. The antenna configuration shown in FIG. 7 is best understood by a comparison with the instruments shown in FIGS. 2 and 6. As known in the art the direction of an antenna's magnetic dipole moment can be represented by a vector perpendicular to the area encompassed by the antenna (shown as arrows in FIG. 6). FIG. 7 shows the transmitter antenna T and receiver antennas R with their magnetic dipole moments coining out of the page in a Cartesian y-z plane. As seen In FIG. 7, the response or sensitivity of the antennas extends axially on one side of the receiver antenna R furthest from the transmitter T.

For the purposes of this specification it will be clearly understood that the word "comprising" means "including but not limited to", and that the word "comprises" has a corresponding meaning.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An electromagnetic well logging instrument comprising:
    at least one transmitter antenna oriented to have at least some magnetic dipole moment component transverse to an axis of the instrument;
    at least two receiver antennas oriented to have at least some magnetic dipole moment component transverse to said axis and parallel to the magnetic dipole moment component of the at least one transmitter antenna, the at least two receiver antennas axially spaced apart from the transmitter antenna so that a response of the instrument to the transverse magnetic dipole moment component is axially substantially on one side of a more distant spaced one of the at least two receiver antennas.

2. The well logging instrument as defined in claim 1 wherein the at least one transmitter antenna and the at least two receiver antennas are oriented to have a magnetic dipole moment substantially perpendicular to the instrument axis.

3. The well logging instrument as defined in claim 1 wherein a spacing of a first one of the receiver antennas from the at least one transmitter antenna has a ratio with respect to a second one of the receiver antennas from the at least one transmitter antenna of about 0.563.

4. The well logging instrument as defined in claim 1 further comprising circuits coupled to the at least one transmitter antenna and at least two receiver antennas, the circuits adapted to make electromagnetic propagation measurements of earth formations.

5. The well logging instrument as defined in claim 4 wherein the more distant one of the receiver antennas has a spacing at most about equal to a skin depth of a phase shift measurement.

6. The well logging instrument as defined in claim 4 wherein the more distant one of the receiver antennas has a spacing at most about equal to three times a skin depth of an attenuation measurement.

7. The well logging instrument as defined in claim 4 wherein the at least one transmitter antenna, the at least two receiver antennas and the circuits are disposed in a drill collar.

8. The well logging instrument as defined in claim 1 further comprising circuits coupled to the at least one transmitter antenna and at least two receiver antennas, the circuits adapted to make electromagnetic induction measurements of earth formations.

9. An electromagnetic well logging instrument comprising:
    at least one receiver antenna oriented to have at least some magnetic dipole moment component transverse to an axis of the instrument;
    at least two transmitter antennas oriented to have at least some magnetic dipole moment component transverse to said axis and parallel to the magnetic dipole moment component of the at least one receiver antenna, the at least two transmitter antennas axially spaced apart from the receiver antenna so that a response of the instrument to the transverse magnetic dipole moment component is axially substantially on one side of a more distant spaced one of the at least two transmitter antennas.

10. The well logging instrument as defined in claim 9 wherein the at least one receiver antenna and the at least two transmitter antennas are oriented to have a magnetic dipole moment substantially perpendicular to the instrument axis.

11. The well logging instrument as defined in claim 9 wherein a spacing of a first one of the transmitter antennas from the at least one receiver antenna has a ratio with respect to a second one of the transmitter antennas from the at least one receiver antenna of about 0.563.

12. The well logging instrument as defined in claim 9 further comprising circuits coupled to the at least one receiver antenna and at least two transmitter antennas, the circuits adapted to make electromagnetic propagation measurements of earth formations.

13. The well logging instrument as defined in claim 12 wherein the more distant one of the transmitter antennas has a spacing at most about equal to a skin depth of a phase shift measurement.

14. The well logging instrument as defined in claim 12 wherein the more distant one of the transmitter antennas has a spacing at most about equal to three times a skin depth of an attenuation measurement.

15. The well logging instrument as defined in claim 12 wherein the at least one receiver antenna, the at least two transmitter antennas and the circuits are disposed in a drill collar.

16. The well logging instrument as defined in claim 9 further comprising circuits coupled to the at least one receiver antenna and at least two transmitter antennas, the circuits adapted to make electromagnetic induction measurements of earth formations.

17. A method for electromagnetic resistivity well logging, comprising:

passing alternating current through a transmitter antenna disposed in a wellbore, the transmitter having at least some dipole moment component in a direction perpendicular to an axis of the wellbore; and detecting voltages induced in at least two receiver antennas each having at least some dipole moment component parallel to the dipole moment component of the transmitter antenna, the at least two receiver antennas axially spaced apart from the transmitter antenna such that a response of the receivers is substantially axially to one side of the more distant one of the receiver antennas.

18. The method as defined in claim 17 further comprising determining presence of a resistivity discontinuity in a position beyond an axial extent of the wellbore.

19. The method as defined in claim 18 further comprising determining a distance to the discontinuity.

20. The method as defined in claim 19 wherein the determining the distance comprises inversion processing of the detected voltages.

21. The method as defined in claim 18 further comprising determining effect of resistivity discontinuities disposed laterally with respect to the instrument by passing alternating current through a transmitter antenna having at least some dipole moment component parallel to the axis of the wellbore and detecting voltages induced in at least two receiver antennas each having at least some dipole moment component parallel to the axis of the wellbore, the at least two receivers spaced axially from the transmitter at selected locations.

22. The method as defined in claim 17 wherein the at least one transmitter antenna and the at least two receiver antennas are oriented to have a magnetic dipole moment substantially perpendicular to the instrument axis.

23. The method as defined in claim 17 wherein a spacing of a first one of the receiver antennas from the at least one transmitter antenna has a ratio with respect to a second one of the receiver antennas from the at least one transmitter antenna of about 0.563.

24. The method as defined in claim 17 further comprising determining an electromagnetic propagation property of an earth formation from the detected voltages.

25. The method as defined in claim 17 further comprising determining an electromagnetic induction property of an earth formation from the detected voltages.

26. A method for electromagnetic resistivity well logging, comprising:

passing alternating current through at least two transmitter antennas disposed in a wellbore, the transmitter antennas having at least some dipole moment component in a direction perpendicular to an axis of the wellbore; and detecting voltages induced in a receiver antenna having at least some dipole moment component parallel to the dipole moment component of the transmitter antennas, the at least two transmitter antennas axially spaced apart from the receiver antenna such that a response of the receiver antenna is substantially axially to one side of the more distant one of the transmitter antennas.

27. The method as defined in claim 26 further comprising determining presence of a resistivity discontinuity in a position beyond an axial extent of the wellbore.

28. The method as defined in claim 27 further comprising determining a distance to the discontinuity.

29. The method as defined in claim 28 wherein the determining the distance comprises inversion processing of the detected voltages.

30. The method as defined in claim 27 further comprising determining effect of resistivity discontinuities disposed laterally with respect to the instrument by passing alternating current through at least two transmitter antennas each having at least some dipole moment component parallel to the axis of the wellbore and detecting voltages induced in a receiver antenna having at least some dipole moment component parallel to the axis of the wellbore, the at least two transmitter antennas spaced axially from the receiver antenna at selected locations.

31. The method as defined in claim 26 wherein the at least one receiver antenna and the at least two transmitter antennas are oriented to have a magnetic dipole moment substantially perpendicular to the instrument axis.

32. The method as defined in claim 26 wherein a spacing of a first one of the transmitter antennas from the at least one receiver antenna has a ratio with respect to a second one of the transmitter antennas from the at least one receiver antenna of about 0.563.

33. The method as defined in claim 26 further comprising determining an electromagnetic propagation property of an earth formation from the detected voltages.

34. The method as defined in claim 26 further comprising determining an electromagnetic induction property of an earth formation from the detected voltages.

* * * * *